A. C. FORT.
OXYACETYLENE TORCH.
APPLICATION FILED MAY 13, 1918.
1,284,085.
Patented Nov. 5, 1918.
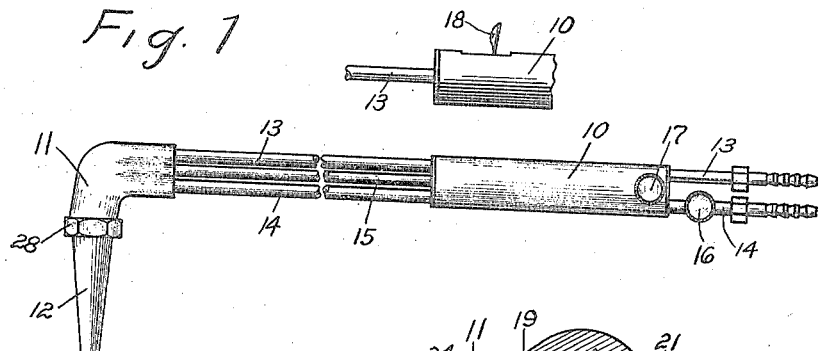
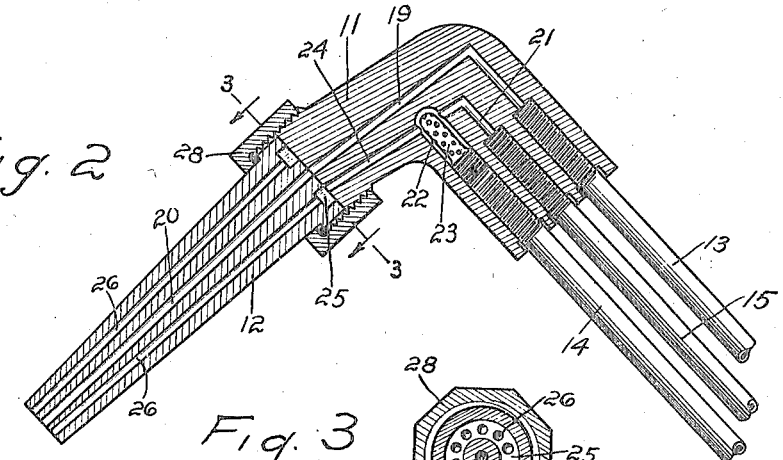
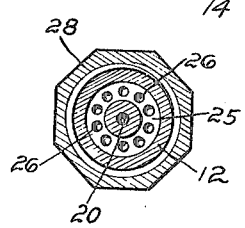
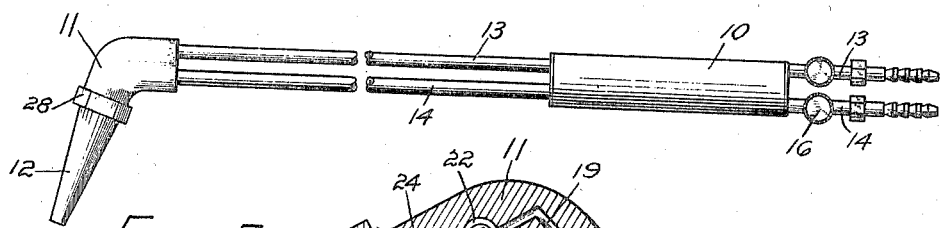
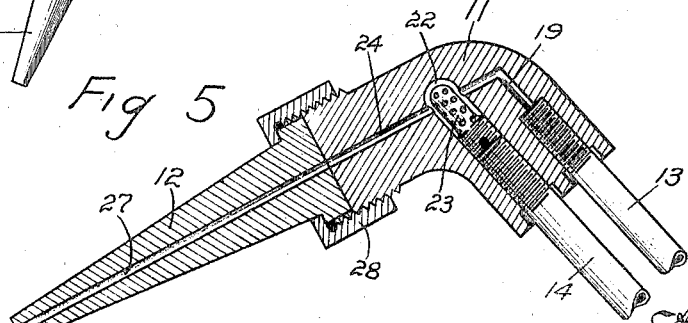
INVENTOR
Albert C. Fort
BY
A. M. Wooster
ATTORNEY

UNITED STATES PATENT OFFICE.

ALBERT C. FORT, OF BRIDGEPORT, CONNECTICUT.

OXYACETYLENE-TORCH.

1,284,085.  Specification of Letters Patent.  Patented Nov. 5, 1918.

Application filed May 13, 1918. Serial No. 234,162.

*To all whom it may concern:*

Be it known that I, ALBERT C. FORT, a citizen of the United States, residing at Bridgeport, county of Fairfield, State of Connecticut, have invented an Improvement in Oxyacetylene-Torches, of which the following is a specification.

This invention relates to oxy-acetylene torches or burners of either the welding or cutting type, and has for its object to produce a torch or burner which shall be relatively simple and inexpensive to produce and which owing to the more perfect combustion which results from my novel construction, will generate a higher heat than has been heretofore obtained in this class of torches, and will do it quicker and with less consumption of fuel.

With these and other objects in view, I have devised the novel oxy-acetylene torch which I will now describe, referring to the accompanying drawing forming a part of this specification and using reference characters to indicate the several parts.

Figure 1 is an elevation illustrating the application of the invention to a cutting torch;

Fig. 1$^A$, a detail view showing an oxygen controlling lever, the point of view being from the direction of the top of the sheet in Fig. 1;

Fig. 2, a longitudinal section on an enlarged scale corresponding with Fig. 1;

Fig. 3, a transverse section on the line 3—3 in Fig. 2, looking in the direction of the arrows;

Fig. 4, an elevation illustrating the application of the invention to a welding torch, and Fig. 5 is a longitudinal section on an enlarged scale corresponding with Fig. 4.

In both forms, 10 denotes the handle, 11 the head, 12 the nozzle, 13 an oxygen supply pipe and 14 an acetylene supply pipe, both of which pass through the handle. Turning now to Figs. 1 to 3 inclusive, within the handle a by pass, not shown, leads from pipe 13 into a secondary oxygen pipe 15. The acetylene supply is controlled by a valve 16, the oxygen supply in pipe 15 is controlled by a valve 17 and the oxygen supply in pipe 13 is controlled by a valve, not shown, operated by lever 18, all of which is ordinary construction. Oxygen pipe 13 leads into a duct 19 in the head, which registers with a central duct 20 in the nozzle. Oxygen pipe 15 leads into a duct 21 which in turn leads into a mixing chamber 22. Within the mixing chamber is an atomizer 23, into which acetylene supply pipe 14 leads. From the mixing chamber a duct 24 leads to the forward end of the head and terminates in position to register with a ring shaped chamber 25 in the base of the nozzle. From this chamber a plurality of ducts 26, arranged in circular form, converge toward the end of the nozzle. In practice ducts 26 may be called pre-heating ducts and the central duct 20 the cutting duct, as will be more fully explained.

The extreme simplicity of this torch or burner is a vitally important feature. The acetylene passes through the atomizer and is thoroughly broken up thereby as it enters the mixing chamber, so that instantaneous and complete mixing of the oxygen passing into the chamber through duct 21, and the acetylene takes place in the chamber, it being of course understood that the volume of acetylene entering the chamber is controlled by valve 16, and the volume of oxygen entering the chamber is controlled by a valve of which operating lever 18 only appears in the drawing. From the mixing chamber the mixture passes to ring shaped chamber 25 in the base of the nozzle and thence out through converging ducts 26. The effect of the flame from these ducts is to pre-heat, as it is called in the art, the metal to be cut, the actual cutting of the metal being effected by the flame of the central jet which supplied with pure oxygen through pipe 13 and ducts 19 and 20.

The head and the nozzle are both relatively inexpensive to produce. This lessens the cost of the torch as a whole and is especially valuable in connection with the nozzle, as the nozzles wear out and have to be replaced. In the present torch the cost of the nozzles is reduced to the minimum and the time required in replacing a nozzle is practically negligible, as it is simply necessary to remove nut 28 and set it to place again in connection with the new nozzle.

The form illustrated in Figs. 4 and 5 differs only in that there is no provision for pre-heating. The welding is effected by the flame of a jet of the acetylene and oxygen mixture which passes from the mixing chamber through a duct 24, as before, but which instead of leading into a ring shaped chamber in the nozzle leads, in the present form, into a central duct 27.

Having thus described my invention. I claim:

1. A torch of the character described comprising a head having a mixing chamber, an atomizer in said chamber, means for supplying acetylene to the atomizer, means for supplying oxygen to the chamber, a duct for the mixture leading from said chamber, a detachable nozzle having a ring shaped chamber in its base with which the duct communicates, and a series of ducts leading from the ring shaped chamber to the tip of the nozzle.

2. A torch of the character described comprising a head having a mixing chamber, an atomizer in said chamber, means for supplying acetylene to the atomizer, means for supplying oxygen to the chamber, a duct for the mixture leading from said chamber, another duct which supplies oxygen, a detachable nozzle having a ring shaped chamber in its base with which the mixture duct communicates, a series of ducts leading from said chamber to the tip of the nozzle, and a central duct with which the oxygen duct in the head communicates.

3. A torch of the character described comprising a head having an oxygen and acetylene mixing chamber, a mixture duct leading from said chamber, and an oxygen duct, and a detachable nozzle having a ring shaped chamber with which the mixture duct communicates, ducts leading from said chamber to the tip of the nozzle, and a central duct with which the oxygen duct communicates.

In testimony whereof I affix my signature.

ALBERT C. FORT.